US011073975B1

(12) United States Patent
Mueller et al.

(10) Patent No.: US 11,073,975 B1
(45) Date of Patent: Jul. 27, 2021

(54) SYNTHETIC IMAGE GENERATION IN RESPONSE TO USER CREATION OF IMAGE

(71) Applicant: Shutterstock, Inc., New York, NY (US)

(72) Inventors: Derek Mueller, New York, NY (US); Bryan Michael Minor, New York, NY (US)

(73) Assignee: Shutterstock, Inc., New York, NY (US)

( * ) Notice: Subject to any disclaimer, the term of this patent is extended or adjusted under 35 U.S.C. 154(b) by 0 days.

(21) Appl. No.: 16/370,763

(22) Filed: Mar. 29, 2019

(51) Int. Cl.
*G06F 3/0482* (2013.01)
*G06F 3/0484* (2013.01)
*G06F 16/532* (2019.01)
*G06T 11/60* (2006.01)
*G06N 3/08* (2006.01)

(52) U.S. Cl.
CPC ........ *G06F 3/04847* (2013.01); *G06F 3/0482* (2013.01); *G06F 16/532* (2019.01); *G06N 3/08* (2013.01); *G06T 11/60* (2013.01); *G06T 2200/24* (2013.01)

(58) Field of Classification Search
CPC .. G06F 3/04847; G06F 16/532; G06F 3/0482; G06N 3/08; G06T 11/60
See application file for complete search history.

(56) References Cited

U.S. PATENT DOCUMENTS

| | | | |
|---|---|---|---|
| 8,751,530 B1* | 6/2014 | Ioffe | G06F 16/583 707/772 |
| 10,402,446 B2* | 9/2019 | Kamath | G06F 16/58 |
| 2014/0156462 A1* | 6/2014 | Tsuchida | G06Q 30/0623 705/26.61 |
| 2018/0114326 A1* | 4/2018 | Roblek | G06T 7/90 |
| 2018/0268068 A1* | 9/2018 | Kang | G06F 16/532 |
| 2018/0374249 A1* | 12/2018 | Colbert | G06K 9/4628 |

* cited by examiner

*Primary Examiner* — Anil K Bhargava
(74) *Attorney, Agent, or Firm* — McDermott Will & Emery LLP (57) ABSTRACT

Various aspects of the subject technology relate to systems, methods, and machine-readable media for generating a user-created synthetic image. A method includes receiving input from a user onto a search field, the input relating to a desired image of the user, the search field including a user interface for specifying components of the desired image for display to the user. The method also includes identifying the components of the desired image in stock images, the stock images stored in a database. The method also includes generating the components of the desired image based on the stock images, the components located in user-specified locations of the search field. The method also includes generating the user-created synthetic image comprising the components located in user-specified locations in response to the input from the user relating to the desired image.

17 Claims, 5 Drawing Sheets

SYNTHETIC IMAGE GENERATION IN RESPONSE TO USER CREATION OF IMAGE

BACKGROUND

Field

The present disclosure generally relates to a computer-operated image retrieval system, and more particularly to synthetic image generation in response to user creation of an image.

Description of the Related Art

When a user performs a search of a collection of items using a search query, an information retrieval (IR) system commonly matches a user's search terms with content items from the collection that is most relevant to a user's query. The problem of finding a desired multimedia item in a very large collection can be quite daunting. With potentially hundreds of millions of items, the task for the IR system of indicating to a user the item (e.g., image or images) that closely matches the composition within the item that the user had in mind is challenging.

SUMMARY

The present disclosure includes synthetic image generation in response to user creation of an image. For example, a user may identify a desired image through any number of ways, such as through words, sketches, audio description, etc. Based on the user input, a synthetic image is generated that matches the user's description. The synthetic image may be generated through a Generative Adversarial Network (GAN), which may create the synthetic image as the user creates it. The GAN may also learn from the user's preferences.

According to one embodiment of the present disclosure, a computer-implemented method is provided. The method includes receiving input from a user onto a search field, the input relating to a desired image of the user, and the search field including a user interface for specifying components of the desired image for display to the user. The method also includes identifying the components of the desired image in stock images, the stock images stored in a database. The method also includes generating the components of the desired image based on the stock images, the components located in user-specified locations of the search field. The method also includes generating the user-created synthetic image comprising the components located in user-specified locations in response to the input from the user relating to the desired image.

According to one embodiment of the present disclosure, a system is provided including one or more processors and a computer-readable storage medium coupled to the one or more processors, the computer-readable storage medium including instructions. The instructions, when executed by the one or more processors, cause the one or more processors to receive input from a user onto a search field, the input relating to a desired image of the user, and the search field including a user interface for specifying components of the desired image for display to the user. The instructions, when executed by the one or more processors, cause the one or more processors to identify the components of the desired image in stock images, the stock images stored in a database. The instructions, when executed by the one or more processors, cause the one or more processors to generate the components of the desired image based on the stock images, the components located in user-specified locations of the search field. The instructions, when executed by the one or more processors, cause the one or more processors to generate the user-created synthetic image comprising the components located in user-specified locations in response to the input from the user relating to the desired image.

According to one embodiment of the present disclosure, a non-transitory computer-readable storage medium is provided including instructions that, when executed by a processor, cause the processor to perform a method. The method includes receiving input from a user onto a search field, the input relating to a desired image of the user, and the search field including a user interface for specifying components of the desired image for display to the user. The method also includes identifying the components of the desired image in stock images, the stock images stored in a database. The method also includes generating the components of the desired image based on the stock images, the components located in user-specified locations of the search field. The method also includes generating the user-created synthetic image comprising the components located in user-specified locations in response to the input from the user relating to the desired image.

According to one embodiment of the present disclosure, a system is provided that includes means for storing instructions, and means for executing the stored instructions that, when executed by the means, cause the means for executing to perform a method. The method includes receiving input from a user onto a search field, the input relating to a desired image of the user, and the search field including a user interface for specifying components of the desired image for display to the user. The method also includes identifying the components of the desired image in stock images, the stock images stored in a database. The method also includes generating the components of the desired image based on the stock images, the components located in user-specified locations of the search field. The method also includes generating the user-created synthetic image comprising the components located in user-specified locations in response to the input from the user relating to the desired image.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments. In the drawings.

DETAILED DESCRIPTION

In the following detailed description, numerous specific details are set forth to provide a full understanding of the present disclosure. It will be apparent, however, to one ordinarily skilled in the art, that the embodiments of the present disclosure may be practiced without some of these specific details. In other instances, well-known structures and techniques have not been shown in detail so as not to obscure the disclosure.

General Overview

A very common workflow for a user of an image retrieval (IR) system is beginning with a mental conception of an ideal image for a particular purpose. The user then issues a textual query to the IR system where the query is intended to capture in words their mental conception. The IR system then returns a set of images, at which point the user browses through the images, many of which are likely irrelevant, hoping to find one that is relevant. Composition is often an important factor in identifying a relevant image. Moreover, it is distracting to users to look at entire images when the factor they care about may be a certain composition of the image.

The disclosed system addresses a problem in the traditional IR systems, discovery of the most relevant images by composition, which is a problem specifically arising in the realm of computer technology, by providing a solution also rooted in computer technology, namely, by providing for synthetic image generation in response to user creation of an image. For example, a user may identify a desired image through any number of ways, such as through words, sketches, audio description, etc. Based on the user input, a synthetic image is generated that matches the user's description. The synthetic image may be generated through a Generative Adversarial Network (GAN), which may create the synthetic image as the user creates it. The GAN may also learn from the user's preferences. Stock images may be identified for training the GAN in order to teach the GAN to generate the desired image.

The subject system provides several advantages, including providing original generated images that match a compositional input. The subject system may provide a machine learning capability where the GAN can learn from user preferences in order to refine search results with highly relevant content items that match the compositional input. In this regard, the refined search results would yield content items with features that constitute a composition that matches the compositional input to facilitate the user's ability to filter through the search results. With this approach, the system can continually improve its accuracy (and keep up with trending differences of what certain desirable compositions look like) by incorporating user interaction data into the GAN.

The disclosed system further provides improvements to the functioning of the computer itself because it saves data storage space, reduces system loading times, and reduces the cost of system resources. Specifically, the computer hosting the collection of images to be searched is not required to maintain in data storage or repeatedly share over a network images to be searched because the system is configured to generate original images based on user preferences. Given that the subject system continues to learn and refine itself to match user preferences for generating an image, system latency is reduced due to a lesser amount of time needed for a user to locate a desired image composition.

Although many examples provided herein describe a user's search inputs being identifiable (e.g., a user's search history identifying the user's interactions with images from a search result), or download history for images being stored, each user may grant explicit permission for such user information to be shared or stored. The explicit permission may be granted using privacy controls integrated into the disclosed system. Each user may be provided notice that such user information will be shared with explicit consent, and each user may at any time end having the information shared, and may delete any stored user information. The stored user information may be encrypted to protect user security.

The user can at any time delete the user information from memory and/or opt out of having the user information stored in memory. Additionally, the user can, at any time, adjust appropriate privacy settings to selectively limit the types of user information stored in memory, or select the memory in which the user information is stored (e.g., locally on the user's device as opposed to remotely on a server). In many examples, the user information does not include and/or share the specific identification of the user (e.g., the user's name) unless otherwise specifically provided or directed by the user.

Example System Architecture

Figure 1:
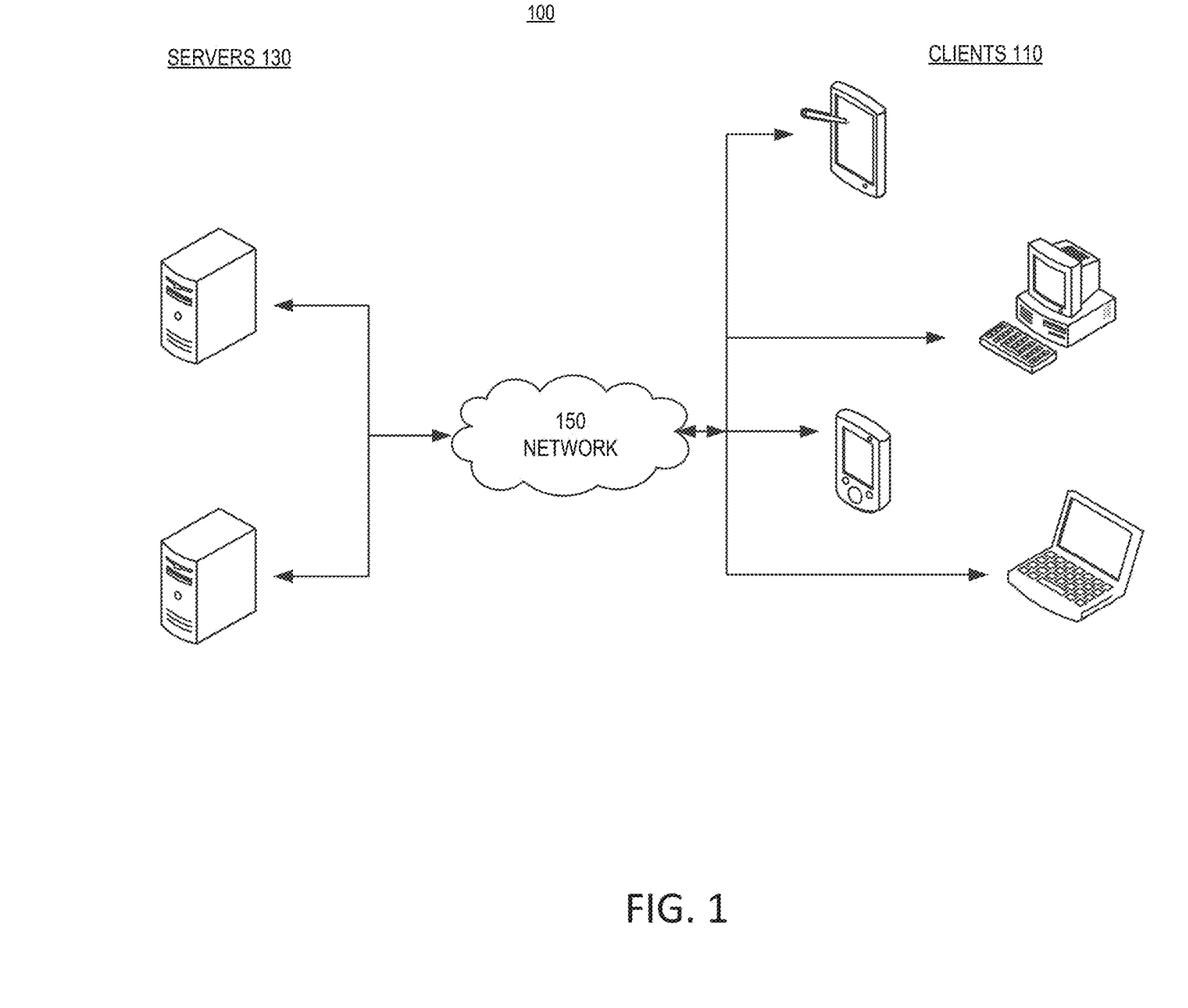
FIG. 1 illustrates an example architecture for synthetic image generation in response to user creation of image, suitable for practicing some implementations of the disclosure.

FIG. 1 illustrates an example architecture 100 for synthetic image generation in response to user creation of image, suitable for practicing some implementations of the disclosure. The architecture 100 includes servers 130 and clients 110 connected over a network 150. One of the many servers 130 is configured to host a computer-operated neural network. The neural network, which can be a convolutional neural network, is trained to identify features of images corresponding to one or more image identifiers. One of the many servers 130 also hosts a collection of images. The collection of images can be searched using an image search engine (e.g., accessible through a web page on one of the clients 110). Images from the collection can also be used to train the neural network to identify features of the images and, with the addition of data indicating one or more objects, once identified, are likely to constitute compositions for the images. The servers 130 can return images tagged with metadata indicating certain compositions (including an arrangement of foreground and background objects) within the images to the clients 110 in response to a search query. For purposes of load balancing, multiple servers 130 can host the neural network and multiple servers 130 can host the collection of images. One of the many servers 130 is also configured to host a computer-operated Generative Adversarial Network (GAN). The GAN may be trained by the images from the collection of images to generate synthetic images.

The servers 130 can be any device having an appropriate processor, memory, and communications capability for hosting the neural network, the collection of images, the GAN, and the image search engine. The image search engine is accessible by various clients 110 over the network 150. The clients 110 can be, for example, desktop computers, mobile computers, tablet computers (e.g., including e-book readers), mobile devices (e.g., a smartphone or PDA), or any other devices having appropriate processor, memory, and communications capabilities for accessing the image search engine on one of the servers 130. The network 150 can include, for example, any one or more of a local area network (LAN), a wide area network (WAN), the Internet, and the like. Further, the network 150 can include, but is not limited to, any one or more of the following network topologies, including a bus network, a star network, a ring network, a mesh network, a star-bus network, tree or hierarchical network, and the like.

Figure 2:
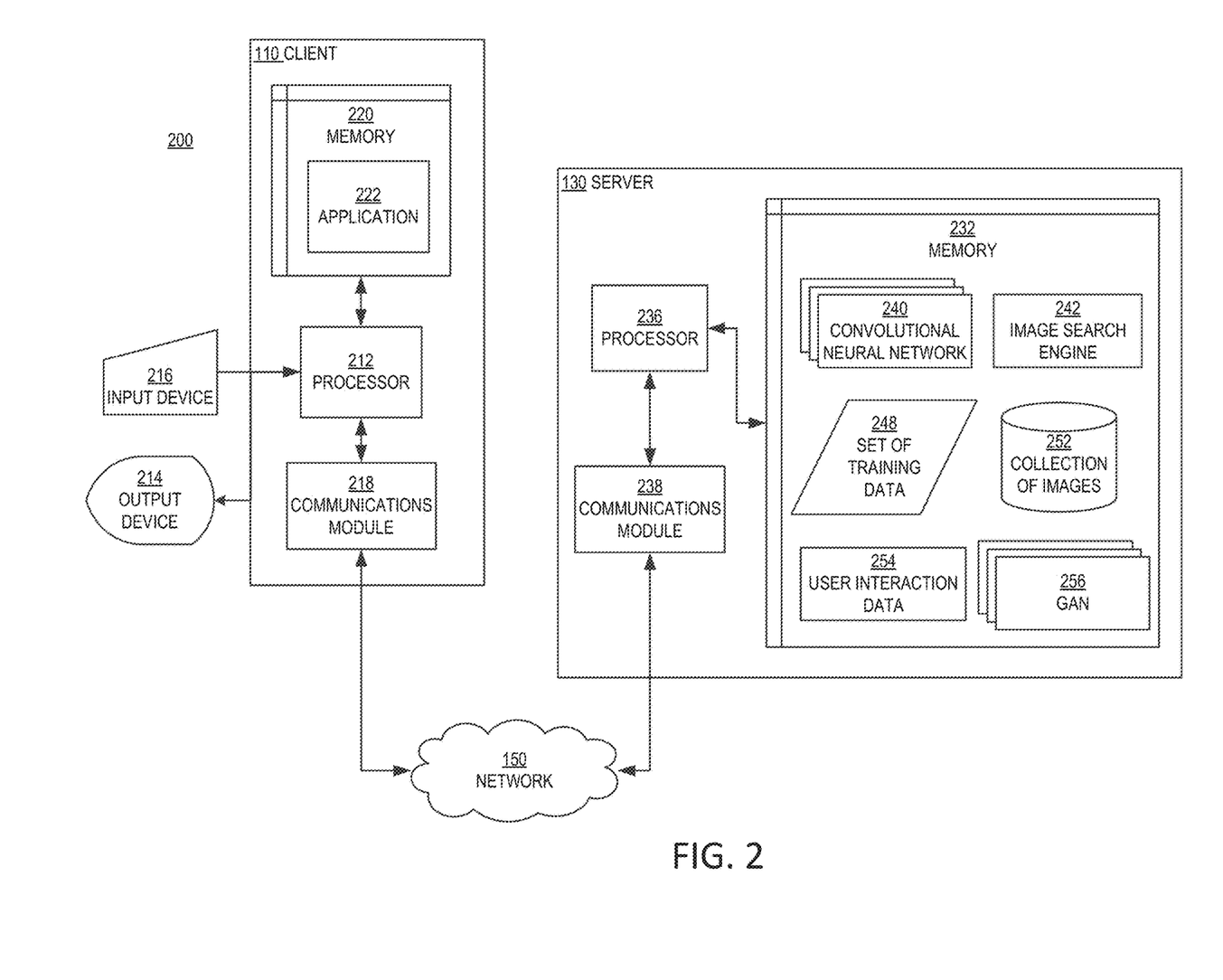
FIG. 2 is a block diagram illustrating an example client and server from the architecture of FIG. 1, according to certain aspects of the disclosure.

Example System for Synthetic Image Generation in Response to User Creation of Image FIG. 2 is a block diagram 200 illustrating an example server 130 and client 110 in the architecture 100 of FIG. 1, according to certain aspects of the disclosure. The client 110 and the server 130 are connected over the network 150 via respective communications modules 218 and 238. The communications modules 218 and 238 are configured to interface with the network 150 to send and receive information, such as data, requests, responses, and commands to other devices on the network. The communications modules 218 and 238 can be, for example, modems or Ethernet cards.

The server 130 includes a memory 232, a processor 236, and a communications module 238. The memory 232 of the server 130 includes a convolutional neural network 240, an image search engine 242, and a GAN 256.

In one or more implementations, the convolutional neural network 240 may be a series of neural networks, one neural network for each object classification. As discussed herein, a convolutional neural network 240 is a type of feed-forward artificial neural network where individual neurons are tiled in such a way that the individual neurons respond to overlapping regions in a visual field. The architecture of the convolutional neural network 240 may be in the object of existing well-known image classification architectures such as AlexNet, GoogLeNet, or Visual Geometry Group models. In one or more implementations, the convolutional neural network 240 consists of a stack of convolutional layers followed by a single fully connected layer. In this respect, the fully connected layer is the layer that maps the convolutional features to one of a plurality of training classes. The convolutional neural network 240 can include a loss layer (e.g., softmax or hinge loss layer) to back propagate errors so that the convolutional neural network 240 learns and adjusts its weights to better fit provided image data. In one or more implementations, the final three layers of the convolutional neural network 240 includes a spatial operator layer, an average-over-width-height layer, and the fully connected layer as the classifier. The spatial operator layer may be configured to receive an input tensor of a configuration (e.g., batch size×number of feature maps×height×width), and produce an output tensor (e.g., batch size×number of new feature maps×new height×width). Examples of the spatial operator layer may include convolution, average pool, max pool, etc. The average-over-width-height layer may be configured to receive an input tensor of the configuration (e.g., batch size×number of feature maps× height×height), and produce an output tensor (e.g., batch size×number of feature maps) by averaging the values over the entire height and width of the tensor, per feature map. The fully connected layer may be configured to map the tensor of the configuration (e.g., batch size×number of feature maps), and produce a tensor (batch size×number of classes).

The memory 232 also includes a collection of images 252. In one or more implementations, the collection of images 252 represents a database that contains, for each image, a mapping from an image identifier to a data file containing pixel data for the image (e.g., in jpeg format). The collection of images 252 can be, for example, a dataset of trained images corresponding to an arbitrary number of object classes. The images may be paired with image vector information and image cluster information. In one or more implementations, the image vector information identifies vectors representing a large sample of images (e.g., about 50 million) and the image cluster information identifies the vectors in one or more clusters such that each of the cluster of images represents a semantic concept. In one or more implementations, the collection of images 252 includes a dataset for each image, where the dataset indicates an array of pixel values for each color channel (e.g., red, blue, green) of the image. The array of pixel values may include an integer value in a range of 0 to 255 for each pixel, where the value indicates how dark a corresponding pixel location should be. Each of the images in the collection of images 252 may include a base layer that includes a representation of an original composition for the image. The original composition may include an arrangement of foreground objects and/or background objects. The base layer may include metadata that identifies one or more objects and their corresponding locations within the original composition. In some aspects, the collection of images 252 may include images that include a base layer and an object layer that overlays the base layer. The object layer may indicate one or more adjustments to the original composition of the base layer. For example, the object layer may indicate a color variation to the base layer, mask out objects from the base layer, and/or add objects by manual drawings corresponding to user input.

Also included in the memory 232 of the server 130 is a set of training data 248. The set of training data 248 can be, for example, a dataset of content items (e.g., images) corresponding to an arbitrary number of object classes with a predetermined number of content items (e.g., about 10,000 images) per object class. In one or more implementations, each object class corresponds to a particular image composition. The set of training data 248 may include multiple instances (or sets) of training data, where at least one instance (or set) of training data is associated with an intended object class. For example, the set of training data 248 may include images that include features that represent positive instances of a desired class so that the convolutional neural network 240 can be trained to distinguish between images with a feature of the desired class and images without a feature of the desired class. The set of training data 248 also may include image vector information and image cluster information. In one or more implementations, the image vector information identifies training vectors representing a large sample of training images and the image cluster information identifies clusters representing respective semantic concepts. In this respect, the vectors corresponding to a semantic concept are clustered into one cluster representing that semantic concept. In one or more implementations, a predetermined number of object classes correspond to one semantic concept.

Although the set of training data 248 is illustrated as being separate from the collection of images 252, in certain aspects the set of training data 248 is a subset of the collection of images 252. Furthermore, although the collection of images 252 and the image search engine 242 are illustrated as being in the same memory 232 of a server 130 as the convolutional neural network 240, in certain aspects the collection of images 252 and the image search engine 242 can be hosted in a memory of a different server but accessible by the server 130 illustrated in FIG. 2.

The memory 232 also includes user interaction data 254. In certain aspects, the processor 236 is configured to determine the user interaction data 254 by obtaining user interaction data identifying interactions with images from image search results that are responsive to search queries. In this respect, the search results may be personalized based on compositional input from users. For example, the processor 236 may determine that a user interacted with an image from a search result, such as, by selecting a segment (or region) of the image for masking, or adding an object via a manual drawing on the image, or the like. The processor 236 may keep track of the user interactions with a number of images over a given time period. The user interaction data 254 may also include data indicating search behavior (and/or patterns) relating to prior image search queries.

Also included in the memory 232 of the server 130 is a GAN 256. The GAN 256 can be, for example, a class of artificial intelligence algorithms used in unsupervised machine learning. The GAN 256 may be implemented by a system of two neural networks (e.g., convolutional neural network 240) contesting with each other in a zero-sum game framework. For example, the GAN 256 may be trained to generate a synthetic image through training data (e.g., the set of training data 248).

The processor 236 of the server 130 is configured to execute instructions, such as instructions physically coded into the processor 236, instructions received from software in memory 232, or a combination of both. For example, the processor 236 of the server 130 executes instructions to submit a plurality of training images containing content identifying different semantic concepts (e.g., tree, moon, birds, etc.) to the convolutional neural network 240 that is configured to analyze image pixel data for each of the plurality of training images to identify features, in each of the plurality of training images, corresponding to a particular semantic concept and receive, from the convolutional neural network 240, and for each of the plurality of training images, an identification of one or more object classes corresponding to the image processed by the convolutional neural network 240.

In certain aspects, the processor 236 of the server 130 is configured to receive a user input from a user. The user input identifies a search query in a given natural language (e.g., English). However, the search query may be provided in a natural language other than the English language depending on implementation such that the image search engine 242 is configured to process search queries in any arbitrary natural language. A user of the client 110 may use the input device 216 to submit a search term or phrase via a user interface of the application 222. In some aspects, the search query may be provided by a manually-entered user drawing, by a voice recognition command, by a visual recognition command, or other machine-learned input command. The user interface may include an input section where the search term or phrase may be typed in, for example. The input section may include one or more controls to allow the user to initiate the image search upon receiving the search query. In some aspects, the image search may be initiated automatically upon receiving at least one search term (or at least the search phrase in part).

The search query is then provisioned to the image search engine 242 for initiating the image search through the collection of images 252. The user input is provided, for example, by the user accessing the image search engine 242 over the network 150 using the application 222 in the memory 220 on the client 110 of the user, and the user submitting the user input using the input device 216 of the client 110. For example, the user may use the input device 216 to enter the text-based search term or phrase. In response to the user input via the application 222, a processor 212 of the client 110 is configured to transmit the search query over the network 150 using the communications module 218 of the client 110 to the communications module 238 of the server 130.

The processor 236 of the server 130, upon receiving the search query for the image search engine 242, is configured to submit a search request for the search query to the image search engine 242. The image search engine 242 initiates a forward image search based on the search request, where the image search engine 242 searches for images from the collection of images 252 that closely correspond to the search terms of the search request.

The processor 236 then receives an identification of a plurality of images from the collection of images 252 that are responsive to the search query, and is configured to provide an initial listing of images. The initial listing of images may be prioritized (or ranked), for example, by the processor 236 of the server 130 being configured to submit a set of training images (e.g., the set of training data 248) to the convolutional neural network 240 prior to the search query being received. The processor 236 may then provide the initial listing of images to the application 222 on the client 110 over the network 150 for display by an output device 214 of the client 110.

In one or more implementations, each of the searched images may be utilized to train the GAN 256 to generate synthetic images relating to the searched images. For example, searched images relating to a "dog" may be utilized to train the GAN 256 to generate synthetic images of dogs. In this way, the GAN 256 may be trained to generate synthetic images for a wide variety of subjects.

Figure 3:
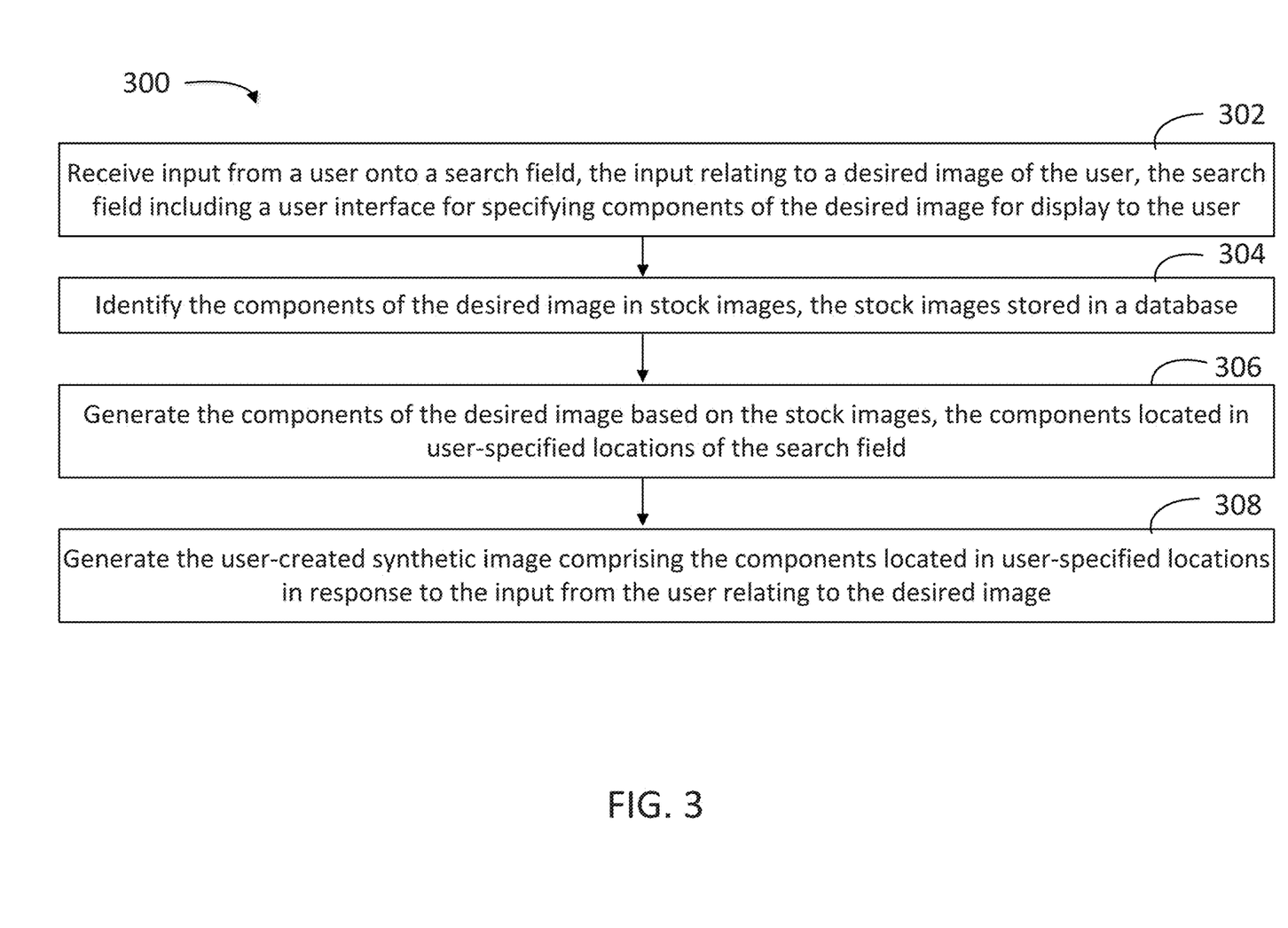
FIG. 3 illustrates an example process for synthetic image generation in response to user creation of image, using the example client and server of FIG. 2.

FIG. 3 illustrates an example process 300 for synthetic image generation in response to user creation of image. For explanatory purposes, the example process 300 is described herein with reference to the example client and server of FIG. 2. Further, for explanatory purposes, the blocks of the example process 300 are described herein as occurring serially or linearly. However, multiple blocks of the example process 300 may occur in parallel. In addition, the blocks of the example process 300 need not be performed in the order shown and/or one or more of the blocks of the example process 300 need not be performed. For purposes of explanation of the subject technology, the process 300 will be discussed in reference to FIG. 2.

The process 300 begins in step 302 where the server 130 receives input from the client 110 (e.g., a user). For example, the input may be entered into a search field through the input device 216. The input may relate to a desired image of the user. The search field may include a user interface for specifying components of the desired image for display to the user through the output device 214.

In step 304, the components of the desired image are identified in the collection of images 252 (e.g., stock images). For example, stock images may be stored in the memory 232 (e.g., a database). As described above in FIG. 2, the image search engine 242 may perform a search of the collection of images 252 to identify components of the collection of images 252 that match with a search query of the user.

In step 306, the components of the desired image are generated by the GAN 256 based on the stock images. The components may be located in user-specified locations of the search field. For example, if the user searches for "tree," the search engine 242 may search the collection of images 252 for images that contain trees. The identified images with dogs may be added to the set of training data 248 for training the GAN 256 to generate synthetic images of trees. The GAN 256 may then generate synthetic images of trees to be included in the user-specified locations in the search field. For example, the user may specify for the tree to be in the upper left quadrant.

Figure 4:
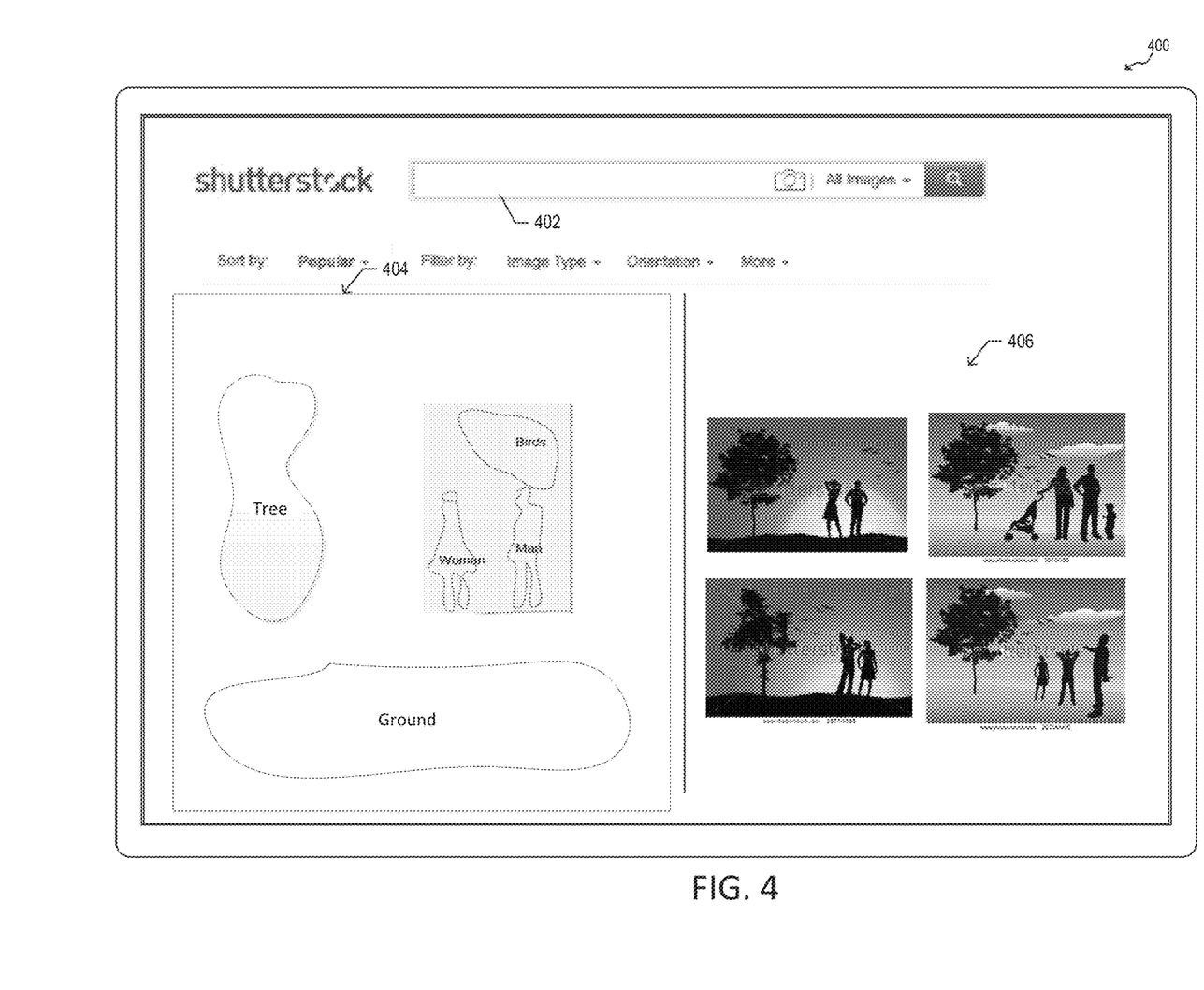
FIG. 4 illustrates an example of a user interface for practicing the example process of FIG. 3.

In step 308, the user-created synthetic image is generated by the GAN 256. The generated synthetic image includes the components desired by the user. The components are located in the user-specified locations of the image in response to the input from the user relating to the desired image. For example, the user may designate that a tree is in the upper left quadrant. The user may also designate that a man, a woman, and birds are located in the right half, and the ground is in a lower portion (e.g., as illustrated in FIG. 4). The GAN 256 may be trained by the training data 248 to generate synthetic images of a tree, man, woman, birds, and ground in the appropriate locations in an image.

According to an aspect, the example process 300 further includes receiving light source information from the user. For example, the light source information may relate to desired illumination characteristics for the desired image.

According to an aspect, the example process 300 further includes tracking preferences of the user in user interaction data 254 based on the input received from the user in the search field. According to an aspect, the example process 300 further includes displaying to the user pictures relating to the components, and selecting, by the user, at least one of the pictures relating to the components.

According to an aspect, the example process 300 further includes generating through the GAN 256 new images (e.g., synthetic images) based on the stock images (e.g., collection of images 252) in response to the input, and displaying the new images to the user.

According to an aspect, the input (e.g. search query) may include at least one of typed words, a sketch, or audio from the user. The user interface may include options for inputting at least one of typed words, a sketch, or audio into the search field.

FIG. 4 illustrates an example of a user interface 400 for practicing the example process of FIG. 3 via the application 222 of the client 110. In one or more implementations, the user interface 400 includes a search query field 402, an input section 404, and generated synthetic images 406. For example, a user may utilize the search query field 402 to describe a desired image. The search query field 402 may also allow the user to provide an audio description. The audio description may be transcribed and displayed in the search query field 402 for confirmation and/or further editing for refinement of the search.

The user may also utilize the input section 404 to sketch or otherwise designate desired components in the image. For example, as illustrated, the user has input sketches and descriptions relating to "tree," "man," "woman," "birds," and "ground" (e.g., components). Each of these sketches are located in different quadrants of the input section 404. The processor 236, using the image search engine 242, initiates a forward image search using the vector indicating each of the search terms/sketches, and produces a search result that includes images having the desired components. These images are utilized by the GAN 256 for training on how to generate the desired components. The components are then generated by the GAN 256 and displayed in the appropriate quadrants in the synthetic images 406. In this way, the user may customize a desired photo for generation. Additionally, user preferences may be tracked and stored as user interaction data 254 for further optimization of future searches.

According to an aspect, if the user needs help in starting the search, a light source may be suggested as a starting point. Additionally, the search may be done in increments, such as by first obtaining a desired theme and/or location from the user, and then querying the user for more details relating to the image.

Hardware Overview

Figure 5:
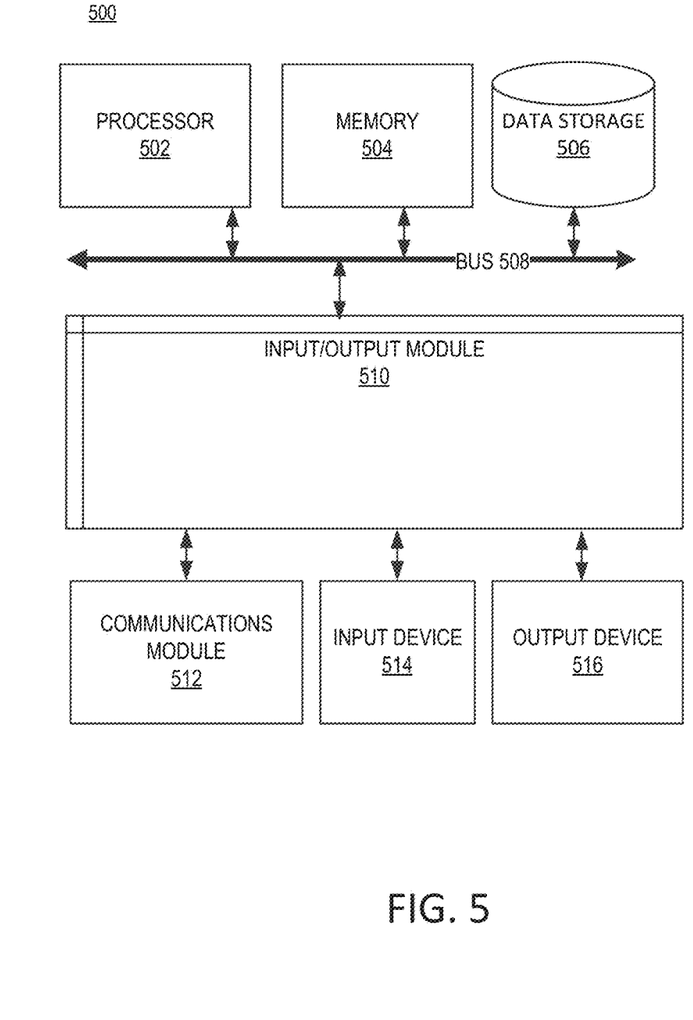
FIG. 5 is a block diagram illustrating an example computer system with which the client and server of FIG. 2 can be implemented.

FIG. 5 is a block diagram illustrating an exemplary computer system 500 with which the client 110 and server 130 of FIG. 1 can be implemented. In certain aspects, the computer system 500 may be implemented using hardware or a combination of software and hardware, either in a dedicated server, or integrated into another entity, or distributed across multiple entities.

Computer system 500 (e.g., client 110 and server 130) includes a bus 508 or other communication mechanism for communicating information, and a processor 502 (e.g., processor 212 and 236) coupled with bus 508 for processing information. By way of example, the computer system 500 may be implemented with one or more processors 502. Processor 502 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

Computer system 500 can include, in addition to hardware, code that creates an execution environment for the computer program in question, e.g., code that constitutes processor firmware, a protocol stack, a database management system, an operating system, or a combination of one or more of them stored in an included memory 504 (e.g., memory 220 and 232), such as a Random Access Memory (RAM), a flash memory, a Read-Only Memory (ROM), a Programmable Read-Only Memory (PROM), an Erasable PROM (EPROM), registers, a hard disk, a removable disk, a CD-ROM, a DVD, or any other suitable storage device, coupled to bus 508 for storing information and instructions to be executed by processor 502. The processor 502 and the memory 504 can be supplemented by, or incorporated in, special purpose logic circuitry.

The instructions may be stored in the memory 504 and implemented in one or more computer program products, i.e., one or more modules of computer program instructions encoded on a computer-readable medium for execution by, or to control the operation of, the computer system 500, and according to any method well-known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, and xml-based languages. Memory 504 may also be used for storing temporary variable or other intermediate information during execution of instructions to be executed by processor 502.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 500 further includes a data storage device 506 such as a magnetic disk or optical disk, coupled to bus 508 for storing information and instructions. Computer system 500 may be coupled via input/output module 510 to various devices. The input/output module 510 can be any input/output module. Exemplary input/output modules 510 include data ports such as USB ports. The input/output module 510 is configured to connect to a communications module 512. Exemplary communications modules 512 (e.g., communications modules 218 and 238) include networking interface cards, such as Ethernet cards and modems. In certain aspects, the input/output module 510 is configured to connect to a plurality of devices, such as an input device 514 (e.g., input device 216) and/or an output device 516 (e.g., output device 214). Exemplary input devices 514 include a keyboard and a pointing device, e.g., a mouse or a trackball, by which a user can provide input to the computer system 500. Other kinds of input devices 514 can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback; and input from the user can be received in any form, including acoustic, speech, tactile, or brain wave input. Exemplary output devices 516 include display devices, such as an LCD (liquid crystal display) monitor, for displaying information to the user.

According to one aspect of the present disclosure, the client 110 and server 130 can be implemented using a computer system 500 in response to processor 502 executing one or more sequences of one or more instructions contained in memory 504. Such instructions may be read into memory 504 from another machine-readable medium, such as data storage device 506. Execution of the sequences of instructions contained in main memory 504 causes processor 502 to perform the process steps described herein. One or more processors in a multi-processing arrangement may also be employed to execute the sequences of instructions contained in memory 504. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. The communication network (e.g., network 150) can include, for example, any one or more of a LAN, a WAN, the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

Computer system 500 can include clients and servers. A client and server are generally remote from each other and typically interact through a communication network. The relationship of client and server arises by virtue of computer programs running on the respective computers and having a client-server relationship to each other. Computer system 500 can be, for example, and without limitation, a desktop computer, laptop computer, or tablet computer. Computer system 500 can also be embedded in another device, for example, and without limitation, a mobile telephone, a PDA, a mobile audio player, a Global Positioning System (GPS) receiver, a video game console, and/or a television set top box.

The term "machine-readable storage medium" or "computer-readable medium" as used herein refers to any medium or media that participates in providing instructions to processor 502 for execution. Such a medium may take many forms, including, but not limited to, non-volatile media, volatile media, and transmission media. Non-volatile media include, for example, optical or magnetic disks, such as data storage device 506. Volatile media include dynamic memory, such as memory 504. Transmission media include coaxial cables, copper wire, and fiber optics, including the wires that comprise bus 508. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter effecting a machine-readable propagated signal, or a combination of one or more of them.

As used herein, the phrase "at least one of" preceding a series of items, with the terms "and" or "or" to separate any of the items, modifies the list as a whole, rather than each member of the list (i.e., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

To the extent that the term "include," "have," or the like is used in the description or the claims, such term is intended to be inclusive in a manner similar to the term "comprise" as "comprise" is interpreted when employed as a transitional word in a claim. The word "exemplary" is used herein to mean "serving as an example, instance, or illustration." Any embodiment described herein as "exemplary" is not necessarily to be construed as preferred or advantageous over other embodiments.

A reference to an element in the singular is not intended to mean "one and only one" unless specifically stated, but rather "one or more." All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed, to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products. Other variations are within the scope of the following claims.

What is claimed is:

1. A computer-implemented method for generating a user-created synthetic image, comprising:
   providing a suggestion of a light source to a user as a starting point for a search;
   in response to the suggestion of the light source, receiving light source information from the user, the light source information relating to illumination characteristics for a synthetic image;
   receiving input from the user onto a search field, the input relating to the synthetic image by the user, the search field comprising a user interface for sketching components of the synthetic image by the user, the input comprising sketched components by the user;
   identifying the sketched components of the synthetic image in portions of stock images, the stock images stored in a database;
   generating images of the sketched components for the synthetic image based on the portions of the stock images, the sketched components located in user-specified locations of the search field;
   training a Generative Adversarial Network (GAN) to generate new images based on the portions of the stock images in response to the input;
   generating, through the trained GAN, new images based on the portions of the stock images in response to the input;
   generating the synthetic image comprising the new images located in the user-specified locations in response to the input from the user relating to the synthetic image;
   tracking the input from the user as user interaction data;
   storing the user interaction data as user preferences for further optimization of future searches by the user;
   receiving, through privacy settings of privacy controls, consent from the user to publicly share user information including the user preferences;
   in response to receiving the consent from the user, publicly sharing the user information; and
   encrypting the user information.

2. The computer-implemented method of claim 1, further comprising:
   tracking preferences of the user based on the input received from the user in the search field.

3. The computer-implemented method of claim 1, further comprising:
   displaying to the user a plurality of pictures relating to the components; and
   selecting, by the user, at least one of the plurality of pictures relating to the components.

4. The computer-implemented method of claim 1, further comprising:
   displaying the new images to the user.

5. The computer-implemented method of claim 1, wherein receiving the input comprises receiving at least one of typed words, or audio from the user.

6. The computer-implemented method of claim 1, wherein the user interface comprises options for inputting at least one of typed words, the sketch, or audio into the search field.

7. A system for generating a user-created synthetic image, comprising:
   a processor; and a memory comprising instructions stored thereon, which when executed by the processor, causes the processor to perform:
  providing a suggestion of a light source to a user as a starting point for a search;
  in response to the suggestion of the light source, receiving light source information from the user, the light source information relating to illumination characteristics for a synthetic image;
  receiving input from the user onto a search field, the input relating to the synthetic image by the user, the search field comprising a user interface for sketching components of the synthetic image by the user, the input comprising sketched components by the user;
  identifying the sketched components of the synthetic image in portions of stock images, the stock images stored in a database;
  generating images of the sketched components for the synthetic image based on the portions of the stock images, the sketched components located in user-specified locations of the search field;
  training a Generative Adversarial Network (GAN) to generate new images based on the portions of the stock images in response to the input;
  generating, through the trained GAN, new images based on the portions of the stock images in response to the input;
  generating the synthetic image comprising the new images located in the user-specified locations in response to the input from the user relating to the synthetic image;
  tracking the input from the user as user interaction data;
  storing the user interaction data as user preferences for further optimization of future searches by the user;
  receiving, through privacy settings of privacy controls, consent from the user to publicly share user information including the user preferences;
  in response to receiving the consent from the user, publicly sharing the user information; and
  encrypting the user information.

8. The system of claim 7, further comprising stored sequences of instructions, which when executed by the processor, cause the processor to perform:
  tracking preferences of the user based on the input received from the user in the search field.

9. The system of claim 7, further comprising stored sequences of instructions, which when executed by the processor, cause the processor to perform:
  displaying to the user a plurality of pictures relating to the components; and
  selecting, by the user, at least one of the plurality of pictures relating to the components.

10. The system of claim 7, further comprising stored sequences of instructions, which when executed by the processor, cause the processor to perform:
  displaying the new images to the user.

11. The system of claim 7, wherein receiving the input comprises receiving at least one of typed words, or audio from the user.

12. The system of claim 7, wherein the user interface comprises options for inputting at least one of typed words, the sketch, or audio into the search field.

13. A non-transitory computer-readable storage medium is provided including instructions that, when executed by a processor, cause the processor to perform a method for generating a user-created synthetic image, comprising:
  providing a suggestion of a light source to a user as a starting point for a search;
  in response to the suggestion of the light source, receiving light source information from the user, the light source information relating to illumination characteristics for a synthetic image;
  receiving input from the user onto a search field, the input relating to the synthetic image by the user, the search field comprising a user interface for sketching components of the synthetic image by the user, the input comprising sketched components by the user;
  identifying the sketched components of the synthetic image in portions of stock images, the stock images stored in a database;
  generating images of the sketched components for the synthetic image based on the portions of the stock images, the sketched components located in user-specified locations of the search field;
  training a Generative Adversarial Network (GAN) to generate new images based on the portions of the stock images in response to the input;
  generating, through the trained GAN, new images based on the portions of the stock images in response to the input;
  generating the synthetic image comprising the new images located in the user-specified locations in response to the input from the user relating to the synthetic image;
  tracking the input from the user as user interaction data;
  storing the user interaction data as user preferences for further optimization of future searches by the user;
  receiving, through privacy settings of privacy controls, consent from the user to publicly share user information including the user preferences;
  in response to receiving the consent from the user, publicly sharing the user information; and
  encrypting the user information.

14. The non-transitory computer-readable storage medium of claim 13, wherein the method further comprises:
  tracking preferences of the user based on the input received from the user in the search field.

15. The non-transitory computer-readable storage medium of claim 13, wherein the method further comprises:
  displaying to the user a plurality of pictures relating to the components; and
  selecting, by the user, at least one of the plurality of pictures relating to the components.

16. The non-transitory computer-readable storage medium of claim 13, wherein the method further comprises:
  displaying the new images to the user.

17. The non-transitory computer-readable storage medium of claim 13, wherein the method further comprises:
  receiving at least one of typed words, or audio from the user, wherein the user interface comprises options for inputting the at least one of typed words, the sketch, or audio into the search field.

* * * * *